T. Simmons.
Alcohol Still.
No. 61,770.   Patented Feb. 5, 1867.
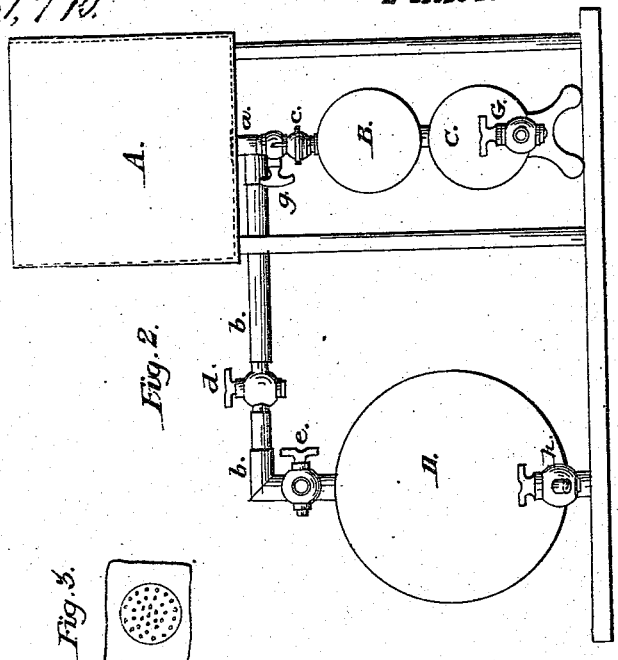
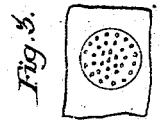
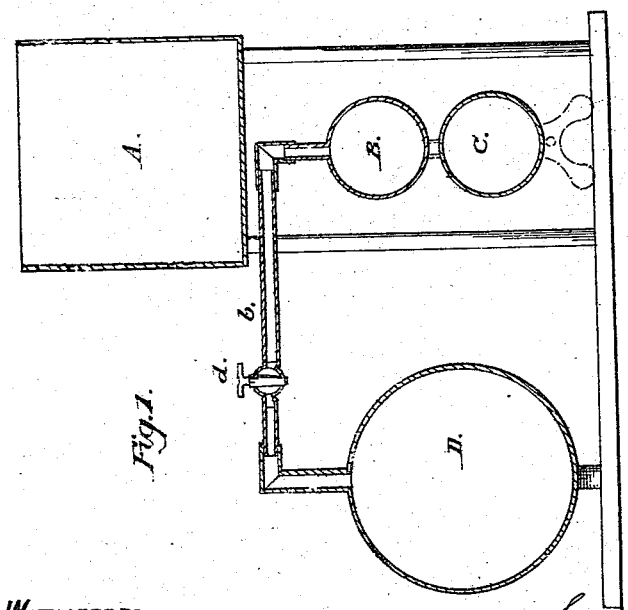
WITNESSES:
A. H. Yeatman
V. D. Stockbridge
INVENTOR:
Thomas Simmons
per
Alexander F. Mason
Attorney.

United States Patent Office.

THOMAS SIMMONS, OF NEW YORK, N. Y.

Letters Patent No. 61,770, dated February 5, 1867.

---

IMPROVED COMPOUND VACUUM RECTIFIER FOR ALCOHOLIC AND OTHER LIQUIDS.

---

The Schedule referred to in these Letters Patent and making part of the same.

---

TO ALL WHOM IT MAY CONCERN:

Be it known that I, THOMAS SIMMONS, of New York, in the county of New York, and in the State of New York, have invented certain new and useful "Compound Vacuum Rectifiers" for Liquors, Spirits, and other Fluids; and do hereby declare that the following is a full, clear, and exact description thereof, reference being had to the accompanying drawings, and to the letters of reference marked thereon.

In the annexed drawings, making part of this specification, A represents the reservoir in which the spirits to be rectified is placed. At or about the centre of the bottom of this reservoir is an opening, which is covered by gauze wire or a perforated plate. This opening connects with a pipe, $a$, which said pipe leads down into a cylinder B. Beneath the cylinder B is a similar cylinder, marked C, the two being connected by suitable pipes passing from the bottom of the upper to the top of the lower cylinder. The pipe $a$, which leads from the reservoir A, is provided with a stop-cock, which will allow or stop the passage of the liquor through said pipe. D represents a cylinder, which I propose to make of any required capacity, but usually of larger capacity than that of the other two cylinders, B and C, combined. This cylinder D is connected to the upper cylinder B by means of a pipe, $b$, which said pipe is provided with a stop-cock, $d$. $c$ represents a stop-cock to a vent pipe on top of cylinder B, and G represents a stop-cock to an exit pipe at the bottom and one end of the lower cylinder C. $h$ represents a stop-cock to a waste pipe at one end and near the bottom of cylinder D. $x$ represents a steam pipe, which is provided with a stop-cock $e$. This steam pipe runs from a steam-generating apparatus, and connects with the cylinder D.

In using this invention, I place the rectifying or filtering material in the bottom of the tank or reservoir A. I then pour the spirits to be rectified into said reservoir. The stop-cock $d$ being closed, I open the cocks $e$ of the steam pipe and the cock $h$ of the waste pipe. The pipe $x$ allows the steam from the steam-generating apparatus to pass into the cylinder D, and the cock $h$ allows the air to pass out from said cylinder as fast as the steam passes in. As soon as the atmospheric air has been expelled from the cylinder D by means of the steam, the cocks $e$ and $h$ are closed. The steam in the cylinder becoming condensed, an almost complete vacuum is produced in it. As soon as this takes place, the cock $d$ is opened; this allows the air from the two cylinders B and C to rush into cylinder D, to restore the equilibrium, which, of course, creates a very thin atmosphere or partial vacuum in the two cylinders B and C. The cock $g$ is now opened, and the process of rectifying or filtering begins, as the liquid from the reservoir is not only forced down by its own gravity and atmospheric pressure through the filtering material, but is drawn down by the partial vacuum in the cylinders beneath it. It will be seen that there is a great advantage gained by the use of the cylinder D, for by its use no steam is allowed to pass into the cylinders which receive the rectified or filtered liquor from the tank A. If steam were introduced into the cylinders B and C, there would of course be a certain amount of water remaining after condensation of the steam, which would dilute or adulterate the liquor to some extent.

Having thus fully described my invention, what I claim as new, and desire to secure by Letters Patent, is—

The use of the cylinder D, when used in combination with one or more cylinders for receiving the rectified liquor, for the purpose of creating a partial vacuum in the receiving cylinder without the introduction of steam, substantially as specified.

In testimony that I claim the foregoing, I have hereunto set my hand and seal this 18th day of January, 1867.

THOMAS SIMMONS.

Witnesses:
C. M. ALEXANDER,
J. M. MASON.